Oct. 15, 1946.    C. W. LEGUILLON    2,409,571
APPARATUS FOR SPLICING RUBBERLIKE MATERIALS
Filed April 29, 1942
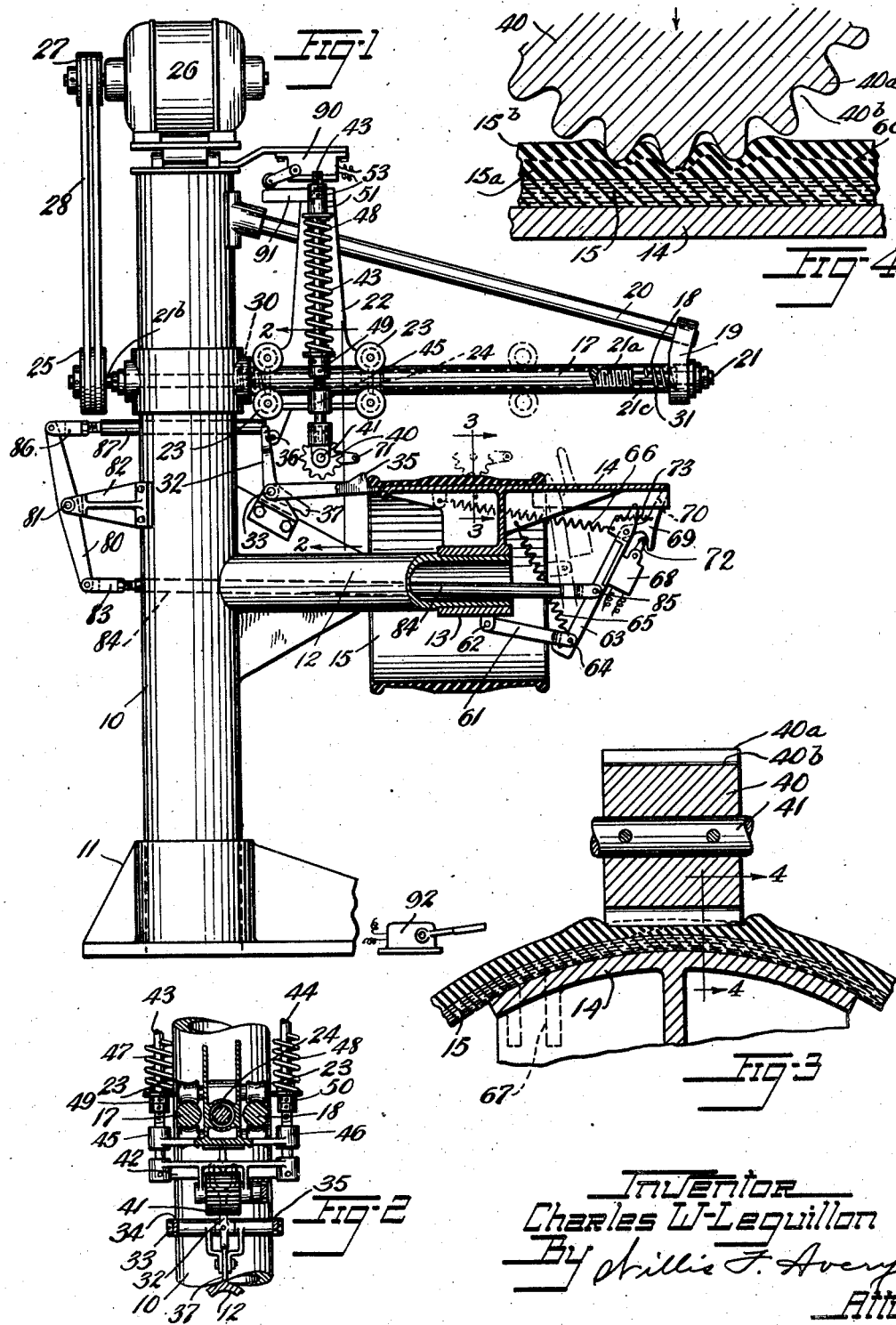
Inventor
Charles W. Leguillon
By Willis F. Avery
Atty.

Patented Oct. 15, 1946

2,409,571

UNITED STATES PATENT OFFICE 2,409,571

APPARATUS FOR SPLICING RUBBERLIKE MATERIAL

Charles W. Leguillon, Akron, Ohio, assignor to The B. F. Goodrich Company, New York, N. Y., a corporation of New York Application April 29, 1942, Serial No. 440,928

1 Claim. (Cl. 154—10)

This invention relates to the splicing of plastic rubber-like material and is especially useful in perfecting the seams of articles of rubber-like material, especially those of considerable thickness, such as tire treads.

In the manufacture of articles of unvulcanized rubber composition or other rubber-like materials, especially where the materials were of substantial thickness, it has been necessary to splice slabs or strips of material, as in forming endless bands or the like, and for this purpose the ends to be spliced have been scarfed or skived, overlapped, and brought together. Great difficulty has sometimes been experienced in obtaining a permanent union of the material at the splice, especially in the use of synthetic rubber materials.

The principal objects of the present invention are to provide for a strong union of the splice entirely through the depth thereof, to provide an intermingling of the spliced materials by a kneading or wiping action throughout the depth of the splice even in the case of thick slabs, to effect simultaneous pressing and rubbing or wiping of the splice faces agaist each other throughout the depth of the seam by localized and progressive deep kneading of the materials, and to provide apparatus for effectively providing such kneading of the splice by power and progressively.

These and other objects will appear from the following description and the accompanying drawing.

Of the drawing:

Fig. 1 is a side elevation of apparatus in accordance with and embodying the invention, parts being broken away, with a drum-built tire casing including a tread slab in place thereon.

Fig. 2 is a sectional view taken on line 2—2 of Fig. 1, parts being broken away.

Fig. 3 is a sectional view taken on line 3—3 of Fig. 1, showing the splice.

Fig. 4 is a sectional view taken on line 4—4 of Fig. 3.

In accordance with the invention the rubberlike material at the splice is subjected to a progressive kneading action by supporting it beneath a roller having alternate toothed projections and cross grooves, the projections being deep, approximating the thickness of the material at the splice to effect deep penetration or distortion of the stock, and subjecting it to rolling action of the toothed surface under sufficient pressure to knead the material into intimate surface engagement by a simultaneous pressing and sliding or rubbing of the interfaces throughout the depth of the splice so that virtual cohesion of the materials of the interfaces or line of contact between the two spliced ends is attained for a strong union.

Referring to the drawing, which shows an embodiment of the invention, the numeral 10 designates a pedestal, fixed to a base 11, and having an arm 12, of tubular form, projecting horizontally thereof. A hub 13 is fixed to the outer end of the arm and supports an anvil 14 having an arcuate face adapted to support an annulus 15 such as a tire band having a splice to be treated. Above the anvil, a second arm, comprising a pair of parallel guide rods 17, 18 and a yoke 19 extends horizontally from the pedestal and is supported against vertical deflection by a brace 20 connecting its outer end to the pedestal.

A rotatable shaft 21 is journaled in the yoke 19 at the outer ends of rods 17, 18 and in the pedestal 10 through which it extends. The shaft has an enlarged threaded portion 21a and reduced unthreaded end portions 21b, 21c and extends parallel to guide rods 17, 18 and therebetween. A carriage 22 is mounted for movement along the guide rods 17, 18 toward and from the pedestal and has anti-friction rollers 23 which support it from the rods. A threaded nut 24 engages the screw shaft 21 and is fixed to the carriage 22. The shaft 21 has a multiple grooved pulley 25 fixed thereto or driving it from an electric motor 26 on the pedestal through motor pulley 27 and V-belts 28. The arrangement is such that by reversal of the motor the screw shaft 21 may be driven in either direction to cause the carriage 22 to move toward or from the pedestal. At a position near the pedestal and short of contact of the carriage 22 with the pedestal, the nut 24 may leave the threaded portion of the shaft but is held against the threaded portion by a coil spring 30, and at the opposite end of the screw shaft the nut may leave the threaded portion but is held thereagainst by a second compression coil spring 31. This arrangement limits movement of the carriage upon over-running of the shaft.

For positioning a tire band 15 on the anvil 14, a forked stop arm 32 is fixed to a cross shaft 33 journaled in arm 12. A pair of stops 34, 35 are also fixed to the same shaft. A pin 36 on carriage 22 is adapted to hold the arm 32 in a vertical position when the carriage 22 is near the pedestal, raising stops 34, 35 above the arcuate face of anvil 14. At an advanced position of the carriage, the stops 34, 35 may drop below the anvil surface until a stop arm 37 on shaft 33 prevents further movement by contact with arm 12. This permits the splice treating roller to contact the tire band without interference of the stops. In the position assumed by the tire band against the stops it overhangs the anvil so that the bead portion thereof may be downwardly deflected by the roller.

For treating the splice, a splice treating roller 40 is mounted on a horizontal shaft 41 journaled in a yoke 42 carried by carriage 22. Yoke 42 is fixed to rods 43, 44 slidably mounted in ears 45, 46 of the carriage 22 for vertical movement. Compression coil springs 47, 48 encircle the rods 43, 44 and force the yoke downwardly. For this purpose adjustable collars 49, 50 are threaded on the rods and the lower ends of the coil springs impinge against them while the upper ends of the springs impinge against ears 51 of the carriage through which the rods slidably extend. Stop nuts 53 are threaded on the ends of the rods above these ears to limit lowering movement of the splice treating roller. The arrangement is such that the roller is urged to its lowermost position by the springs and the tension of the springs may be adjusted to provide the desired pressure by adjustment of nuts 49, 50 while the normal position of the roller may be adjusted by adjusting nuts 53.

The splice treating roller 40 is formed about its periphery with axially extending alternate ribs 40a and grooves 40b, the grooves and ribs being of a depth approximating the depth of the rubber-like material of the splice, and the roller is pressed downwardly against the spliced material with sufficient force to cause the ribs to penetrate well into the spliced material, and preferably nearly therethrough as shown in Fig. 4. Referring to Fig. 4 the splice ends of the band 15 are shown in section overlapping each other and are designated 15a, 15b. It will be seen that these ends are joined by a seam 60 and that the ribs 40a of the roller 40 penetrate the material to an extent that the seam line is deflected.

The strong union results apparently from the fact that such action of the ribs stretches the material at the seam while forcing it firmly into intimate contact by a wiping or kneading action causing the interfaces to be rubbed together throughout their depth to effect initial cohesion of the material of the interfaces.

As the material is subjected locally to high pressure applied at the tops of the ribs, the material opposite the grooves between the ribs is free from pressure and is confined only laterally between the ribs so that material of both overlapping ends wells upwardly between the ribs and great stretching and tendency of the ends to slide upon each other is provided, the churning or kneading of the material of the ends upon each other causing them to seize each other by virtue of the flow of the material. As the ribs are withdrawn the material recovers approximately its original shape due to the considerable elasticity of the unvulcanized rubber-like material. By repeated rolling back and forth across the splice, the roller, being free to rotate, contacts the material in different attitudes so that the ribs depress different areas successively and knead the material into a firm union.

For reversing the travel of the splice-treating roller, a link 61 is pivoted at 62 on the hub 13, and an arm 63 is pivoted to the link at 64. A tension coil spring 65 extends from the link 61 at the pivot 64 to the anvil 14 and urges the link upwardly. Another tension coil spring 66 extends from the free end of arm 63 to the anvil and urges the arm 63 in a counter-clockwise direction in Fig. 1. The anvil 14 extends outwardly beyond the band 15 and its extending portion has a slot 67 formed therein and extending in the direction of arm 12. The free end of arm 63 is guided in the slot and may be moved by the springs to a position shown in dot and dash lines in Fig. 1 where its end acts as a stop to hold the band 15 in position against outward movement. A limit switch 68 is mounted on arm 63. A toggle arm 69 is pivoted on the free end of arm 63 and a finger 70 thereof is concealed in slot 67 in the full line position of arm 63 in Fig. 1 and is projected thereabove in the dot and dash position in the path of a pin 71 carried by yoke 42. Toggle arm 69 is held out of contact with a roller arm 72 of limit switch 68 by a tension coil spring 73 attached to arm 63 and toggle arm 69. The arrangement is such that as carriage 22 advances in a direction away from pedestal 10, pin 71 engages finger 70 and toggle arm 69 closes limit switch 68 reversing motor 26 and thereby reversing the movement of carriage 22.

A rocker arm 80 is pivoted at 81 on a bracket 82 fixed to pedestal 10. One end of the rocker arm is pivoted to an adjustable shackle 83 on a link 84 which extends through pedestal 10 and arm 12 to pivotally engage arm 63 at 85. The shackle 83 has screw adjustment for lengthening or shortening the link 84 to accommodate bands 15 of different width. The opposite end of rocker arm 80 is pivotally connected to an adjustable shackle 86 on a push rod 87 which is slidably mounted in and extends through pedestal 10 in a position to engage arm 36 on carriage 22. The arrangement is such that as carriage 22 moves toward the pedestal it engages rod 87 and swings arm 80 to force arm 63 outward to the full line position of Fig. 1 and as carriage 22 moves away from the pedestal springs 65, 66 return arm 63 to the dot and dash line position and rod 87 is advanced through pedestal 10 to the right in Fig. 1 where it is in the path of arm 36.

A limit switch 90 is mounted on pedestal 10 in the path of a cam surface 91 on carriage 22. A starting switch 92 is mounted on the base 11 for foot operation. Switches 68, 90 and 92 are in the control circuit to motor 26 and the arrangement is such that switches 90 and 92 are in parallel and control motor 26 in one direction of rotation, and switch 68 controls motor 26 in the opposite direction of rotation. The arrangement is such that with the motor at rest the apparatus is in the position of Fig. 1 and switch 90 is open. When the operator steps on switch 92 the motor circuit is completed and motor 26 rotates in a direction to rotate screw shaft 21 so that carriage 22 travels away from the pedestal thereby closing switch 90. At the outward end of the stroke switch 68 is closed by contact pin 71 with toggle arm 69 reversing the motor to return the carriage. When the carriage returns to a position adjacent pedestal 10, switch 90 is opened again reversing the motor and the carriage if switch 92 is still depressed. If switch 92 is not depressed, opening of switch 90 will open the motor circuit and stop the carriage.

In carrying out the procedure of the invention, an article having a splice of plastic material therein such as the tire band 15 is placed on the anvil 14. The motor 26 is started by depressing the foot switch 92 and the splice treating roller is caused to traverse the splice back and forth as many times as desired while the roller is pressed strongly against the spliced material by the springs 47, 48. In rolling across the spliced material, the raised ribs on the roller are forced into the plastic material to a substantial depth, locally stretching the spliced ends at their faces of contact so as to obtain an intimate rubbing action of such faces throughout their depth while applying pressure thereto and kneading the material thoroughly together at the splice.

Variations may be made without departing from the scope of the invention as it is defined by the following claim.

I claim:

Apparatus for treating unvulcanized rubber-like tread material to effect a union of a splice throughout the depth of the splice, said apparatus comprising means for supporting the material along the splice, a carriage adapted to be moved back and forth along the splice, a splice-treating roller rotatably mounted on the carriage in position to engage the material at the splice, means for pressing the roller against the material along the splice during its oscillating movement, said roller having alternate axially disposed ribs and grooves on its face for kneading the material deeply and progressively along the splice, means in the path of said carriage for locating the spliced material, and means for withdrawing said locating means from contact with said roller as the roller approaches said locating means.

CHARLES W. LEGUILLON.